(12) United States Patent
Sohn

(10) Patent No.: US 8,375,727 B2
(45) Date of Patent: Feb. 19, 2013

(54) COOLING DEVICE

(76) Inventor: Chun Shig Sohn, Toronto (CA)

( * ) Notice: Subject to any disclaimer, the term of this patent is extended or adjusted under 35 U.S.C. 154(b) by 391 days.

(21) Appl. No.: 12/813,793

(22) Filed: Jun. 11, 2010

(65) Prior Publication Data

US 2011/0302931 A1   Dec. 15, 2011

(51) Int. Cl.
*F25B 21/00* (2006.01)
(52) U.S. Cl. ............... 62/3.1; 62/3.7; 62/335
(58) Field of Classification Search ............ 62/3.1, 62/3.7, 515, 158, 335; 236/48 R, 78 D, 81, 236/DIG. 1
See application file for complete search history.

(56) References Cited

U.S. PATENT DOCUMENTS

| | | | |
|---|---|---|---|
| 4,695,686 A * | 9/1987 | Merchant ................ | 200/61.86 |
| 4,757,688 A | 7/1988 | Basiulis et al. | |
| 4,823,554 A * | 4/1989 | Trachtenberg et al. ......... | 62/3.3 |
| 5,115,723 A * | 5/1992 | Wang ............................. | 92/5 R |
| 5,194,842 A * | 3/1993 | Lau et al. ...................... | 337/373 |
| 5,697,552 A * | 12/1997 | McHugh et al. ............ | 236/78 B |
| 6,532,759 B1 | 3/2003 | Van Den Berg et al. | |
| 6,588,215 B1* | 7/2003 | Ghoshal ........................ | 62/3.1 |
| 6,588,216 B1* | 7/2003 | Ghoshal ........................ | 62/3.1 |
| 6,595,004 B1* | 7/2003 | Ghoshal ........................ | 62/3.1 |
| 7,650,756 B2* | 1/2010 | Muller et al. .................. | 62/3.1 |
| 8,061,147 B2* | 11/2011 | Dinesen et al. ............... | 62/3.1 |
| 2004/0182086 A1* | 9/2004 | Chiang et al. ................. | 62/3.1 |
| 2008/0276623 A1* | 11/2008 | Ali et al. ....................... | 62/3.1 |
| 2009/0025398 A1* | 1/2009 | Muller et al. .................. | 62/3.1 |

* cited by examiner

*Primary Examiner* — Mohammad Ali
(74) *Attorney, Agent, or Firm* — Maschoff Gilmore & Israelsen

(57) ABSTRACT

A cooling device includes a magnetocaloric unit disposed between a heat sink and a heat load, an electromagnet operably connected with the magnetocaloric unit, and at least one thermostat switch disposed between the magneto caloric unit and the heat load. The at least one thermostat switch is configured to make the magnetocaloric unit in contact with either the heat load or the heat sink according to a temperature of the magnetocaloric unit.

20 Claims, 8 Drawing Sheets

COOLING DEVICE

BACKGROUND

Magnetic refrigeration is a cooling technology based on the magnetocaloric effect. This technique can be used to attain extremely low temperatures, as well as the ranges used in common refrigerators, depending on the design of the system, such as a small-sized home freezer, a large-sized commercial freezer, an air conditioner, a heat pump, a distiller, or a drier. The magnetocaloric effect is a magneto-thermodynamic phenomenon in which a reversible change in temperature of a suitable material is caused by exposing the material to a changing magnetic field.

SUMMARY

Various embodiments of cooling devices are disclosed herein. In one embodiment, a cooling device includes a magnetocaloric unit disposed between a heat sink and a heat load, an electromagnet operably connected with the magnetocaloric unit, and at least one thermostat switch disposed between the magnetocaloric unit and the heat load.

In another embodiment, there is provided a method for controlling a cooling device in which a magnetocaloric unit is placed between a heat sink and a heat load. The method includes providing at least one switch between the magnetocaloric unit and the heat load, making the magnetocaloric unit in contact with the heat sink in response to application of a magnetic field to the magnetocaloric unit, and making the magnetocaloric unit in contact with the heat load in response to stop of the application of the magnetic field to the magnetocaloric unit.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
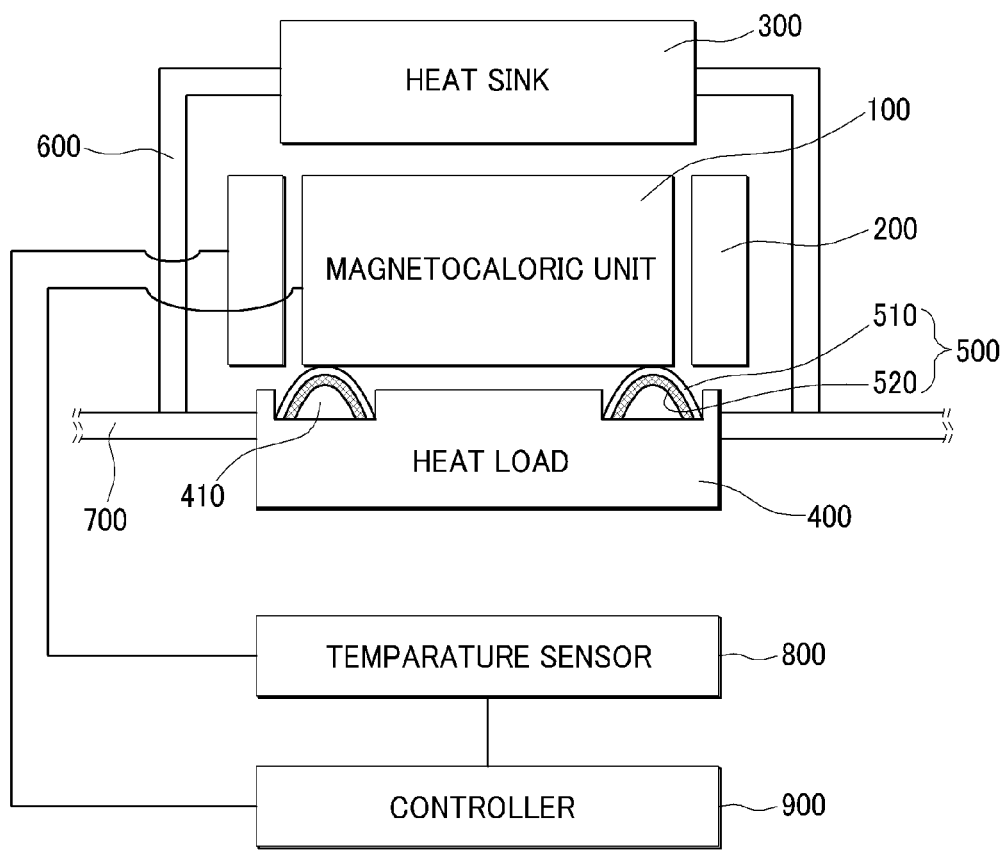
FIG. 1 is a cross-sectional view of an illustrative embodiment of a cooling device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is a cross-sectional view of an illustrative embodiment of a cooling device. The cooling device may include a magnetocaloric unit 100, an electromagnet 200, a heat sink 300, a heat load 400, a thermostat switch 500, an electromagnet cover 600, a heat load cover 700, a temperature sensor 800, and a controller 900. Some embodiments may optionally lack some of the listed elements. For example, the cooling device may optionally lack one or more of electromagnet cover 600, heat load cover 700, temperature sensor 800 and controller 900, which will be described hereinafter.

Magnetocaloric unit 100 may be disposed between heat sink 300 and heat load 400 and it may include a magnetocaloric material. FIG. 1 illustrates that magnetocaloric unit 100 is mounted over heat load 400 with thermostat switch 500 therebetween. In one embodiment, magnetocaloric unit 100 may be configured to exhibit a reversible change in temperature in response to the application of a magnetic field. Specifically, the temperature of magnetocaloric unit 100 may reversibly increase and decrease by changing entropy therein in response to the application of the magnetic field. Further, magnetocaloric unit 100 may absorb heat from heat load 400 and transfer heat to heat sink 300. When magnetocaloric unit 100 is in contact with heat load 400, magnetocaloric unit 100 may absorb heat from heat load 400 by thermal conduction. Meanwhile, when magnetocaloric unit 100 is in contact with heat sink 300, magnetocaloric unit 100 may transfer heat to heat sink 300 by thermal conduction. Heat transfer of magnetocaloric unit 100 between heat sink 300 and heat load 400 will be described hereinafter.

Magnetocaloric unit 100 may absorb the heat generated by heat load 400 and lower a temperature of heat load 400 by using the magnetocaloric material. The magnetocaloric material is used to lower a temperature of heat load 400 by changing entropy of magnetic moments therein. The magnetocaloric material can be heated in response to an application of a magnetic field whereas it can be cooled by stopping the applied magnetic field. The magnetocaloric material may include, for example, but not limited to, Gadolinium (Gd), Fe3O4/Au, GdDyN, LaCaMnO, NdSrMnO or MnFe (P, As) alloys. The magnetic cooling cycle with the magnetocaloric material will be described in detail with reference to FIG. 2.

Figure 2:
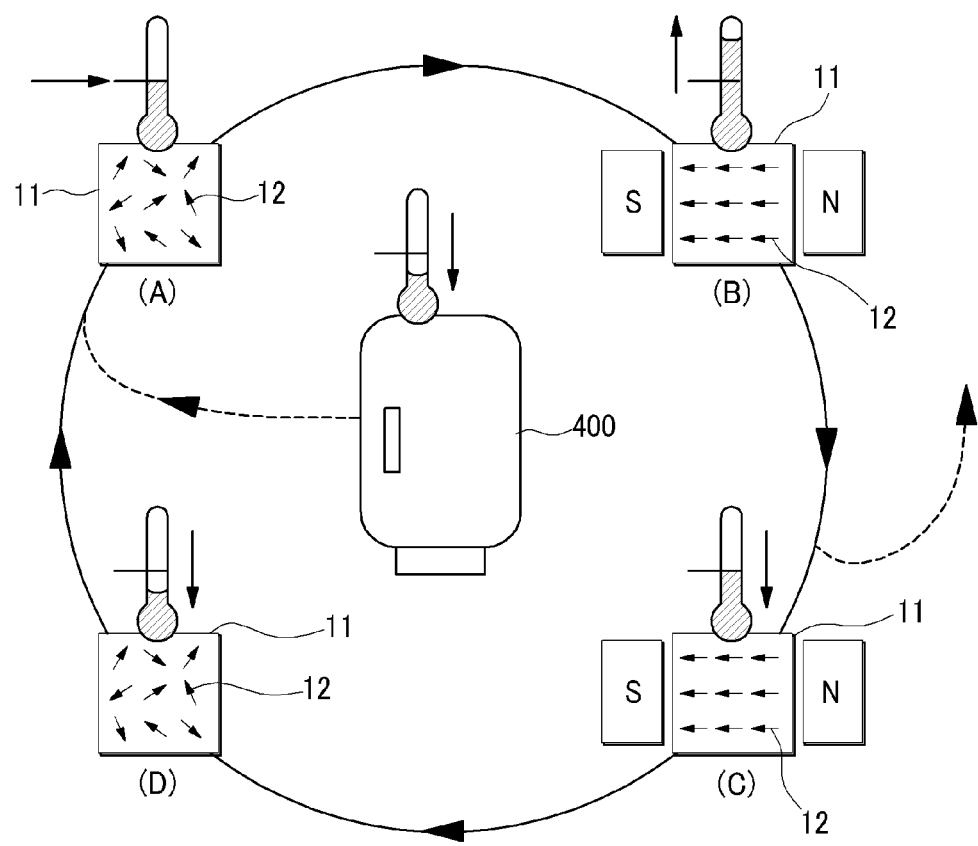
FIG. 2 shows a schematic diagram of a magnetic cooling cycle of a magnetocaloric material.

FIG. 2 shows a schematic diagram of the magnetic cooling cycle of the magnetocaloric material shown in FIG. 1. If a magnetic field is not applied to a magnetocaloric material 11, magnetocaloric material 11 may have randomly orient magnetic moments 12 (Stage A). Here, magnetic moments 12 refer to a measure of its tendency to align with a magnetic field. Then, if a magnetic field is applied to magnetocaloric material 11, magnetic moments 12 in magnetocaloric material 11 may be arranged in a single direction, as shown in FIG. 2, resulting in heating of magnetocaloric material 11 (Stage B).

Heat may be emitted from magnetocaloric material 11 to its surroundings by heat transfer, as depicted by the dot-lined arrow in FIG. 2 (Stage C). Such heat transfer may be accomplished by heat load 400, which will be described in detail hereinafter. Finally, if the magnetic field is removed from magnetocaloric material 11, magnetic moments 12 may be randomized again (Stage D), which leads to cooling of magnetocaloric material 11. As depicted in FIG. 2, the temperature of magnetocaloric material 11 at Stage D is lower than that of magnetocaloric material 11 at Stage A. Thus, the heat from heat load 400, which is in contact with magnetocaloric unit 100 having magnetocaloric material 11, may be emitted to an outside heat load 400 through magnetocaloric material 11 of magnetocaloric unit 100, by applying the magnetic field to magnetocaloric unit 100 and then removing the magnetic field from magnetocaloric unit 100.

Electromagnet 200 may be configured to be operably connected with magnetocaloric unit 100. For example, electromagnet 200 may be adjacent to magnetocaloric unit 100 such that electromagnet 200 can apply a magnetic field to magnetocaloric unit 100. Electromagnet 200 may apply a magnetic field to magnetocaloric unit 100 in response to an electric field applied from an external device, for example, an electric power source (not shown). By way of example, electromagnet 200 may include a solenoid coil and, thus, electromagnet 200 may apply the magnetic field to magnetocaloric unit 100 in response to the electric field applied from the external electric power source.

Heat sink 300 may be configured to absorb heat from magnetocaloric unit 100 by thermal conduction and to emit it to an outside. Heat sink 300 may absorb the heat from magnetocaloric unit 100 by being in contact with magnetocaloric unit 100. The contact between heat sink 300 and magnetocaloric unit 100 can be controlled by thermostat switch 500 in response to the temperature of magnetocaloric unit 100, which will be described in detail hereinafter. By way of examples, heat sink 300 may include, but not limited to, an air-cooled or water-cooled radiator.

Heat load 400 may be configured to transfer heat to magnetocaloric unit 100 by thermal conduction when heat load 400 is in contact with magnetocaloric unit 100. Heat load 400 may transfer heat to magnetocaloric unit 100 by being in contact with magnetocaloric unit 100. The contact between magnetocaloric unit 100 and heat load 400 may be controlled by thermostat switch 500 in response to the temperature of magnetocaloric unit 100, which will be described in detail hereinafter. Heat load 400 may include cooling apparatuses such as, but not limited to, a refrigerator, an air conditioner, a heat pump, or various kinds of chemical apparatuses. Further, heat load 400 may include at least one recess 410 configured to receive at least one thermostat switch 500 therein. An illustrative embodiment of recess 410 and thermostat switch 500 will be described in detail later.

Thermostat switch 500 may be disposed between magnetocaloric unit 100 and heat load 400. For example, thermostat switch 500 may be received in at least one recess 410 of heat load 400 and then magnetocaloric unit 100 may be mounted over thermostat switch 500. As depicted in FIG. 1, magnetocaloric unit 100 may be apart from heat load 400 by the height of thermostat switch 500 protruded from recess 410. Thermostat switch 500 may be configured to make magnetocaloric unit 100 in contact with either heat sink 300 or heat load 400 based on a temperature of magnetocaloric unit 100. A height of thermostat switch 500 may be varied based on the temperature of magnetocaloric unit 100. FIG. 1 illustrates that two thermostat switches 500 are received in two recesses 410 respectively formed two end portions of an upper surface of heat load 400. Although FIG. 1 illustrates two recesses, it is apparent to those skilled in the art that heat load 400 can have less or more than two recesses on its upper surface.

By way of example, thermostat switch 500 may include bimetal switch. The bimetal switch can convert a temperature change into mechanical displacement. Specifically, a height of the bimetal switch can be varied in response to a variation of a temperature of the bimetal switch. In one embodiment, the bimetal switch may include two metal strips 510 and 520 of different metals which expand at different rates as they are heated.

As metal strips 510 and 520 have the different expansion rates, the bimetal switch can be bent in response to the variation of the temperature of bimetal switch. By way of example, metal strips 510 and 520 may be formed from steel and copper, respectively. By way of another example, metal strips 510 and 520 may be formed from steel and brass, respectively. Metal strips 510 and 520 may be joined together throughout their length by brazing or welding. The different expansion rates may force the bimetal switch to be bent in one direction if the bimetal switch is heated, and in the opposite direction if the bimetal switch is cooled below room temperature. In one embodiment, metal strip 510 having a higher thermal expansion rate may be on an outer side of the curved bimetal switch, and metal strip 520 having a lower thermal expansion rate may be on an inner side of the curved bimetal switch. Due to the different expansion rates, metal strip 510 may more expand than metal strip 520 in response to an increase of the temperature of the bimetal switch, and, thus, the bimetal switch can be bent toward metal strip 510.

Electromagnet cover 600 may be configured to cover electromagnet 200. Electromagnet cover 600 can be made of a nonmagnetic material such as, but not limited to, a nonmetallic material, plastic, ebonite, or an insulating material not magnetizing by electromagnet 200.

Heat load cover 700 may be configured to cover heat load 400. Heat load cover 700 may include a thermal insulating material such as, but not limited to, asbestos, glass fiber, polystyrene, cork, $MaCO_3$, or pearlite in order to prohibit heat load 400 from absorbing heat from an outside.

Temperature sensor 800 may be configured to sense a temperature of magnetocaloric unit 100. Temperature sensor 800 may include, for example, but not limited to, a platinum resistance temperature sensor, a thermistor, a thermocouple, a radiation thermometer, or an IC temperature sensor. Further, temperature sensor 800 may transmit a signal indicative of a value of the sensed temperature to controller 900.

Controller 900 may be configured to receive the signal indicative of the value of the sensed temperature from temperature sensor 800 and to control the operation of electromagnet 200 based on the received signal. By way of example, FIG. 1 illustrates that controller 900 is operably (e.g., electronically) coupled to temperature sensor 800 and electromagnet 200. In one embodiment, controller 900 may generate a control signal which activates or deactivates electromagnet 200 in response to the signal transmitted from temperature sensor 800. Controller 900 may transmit the control signal to electromagnet 200. Accordingly, the activation or deactivation of electromagnet 200 can be controlled by the control signal transmitted from controller 900.

Figure 3:
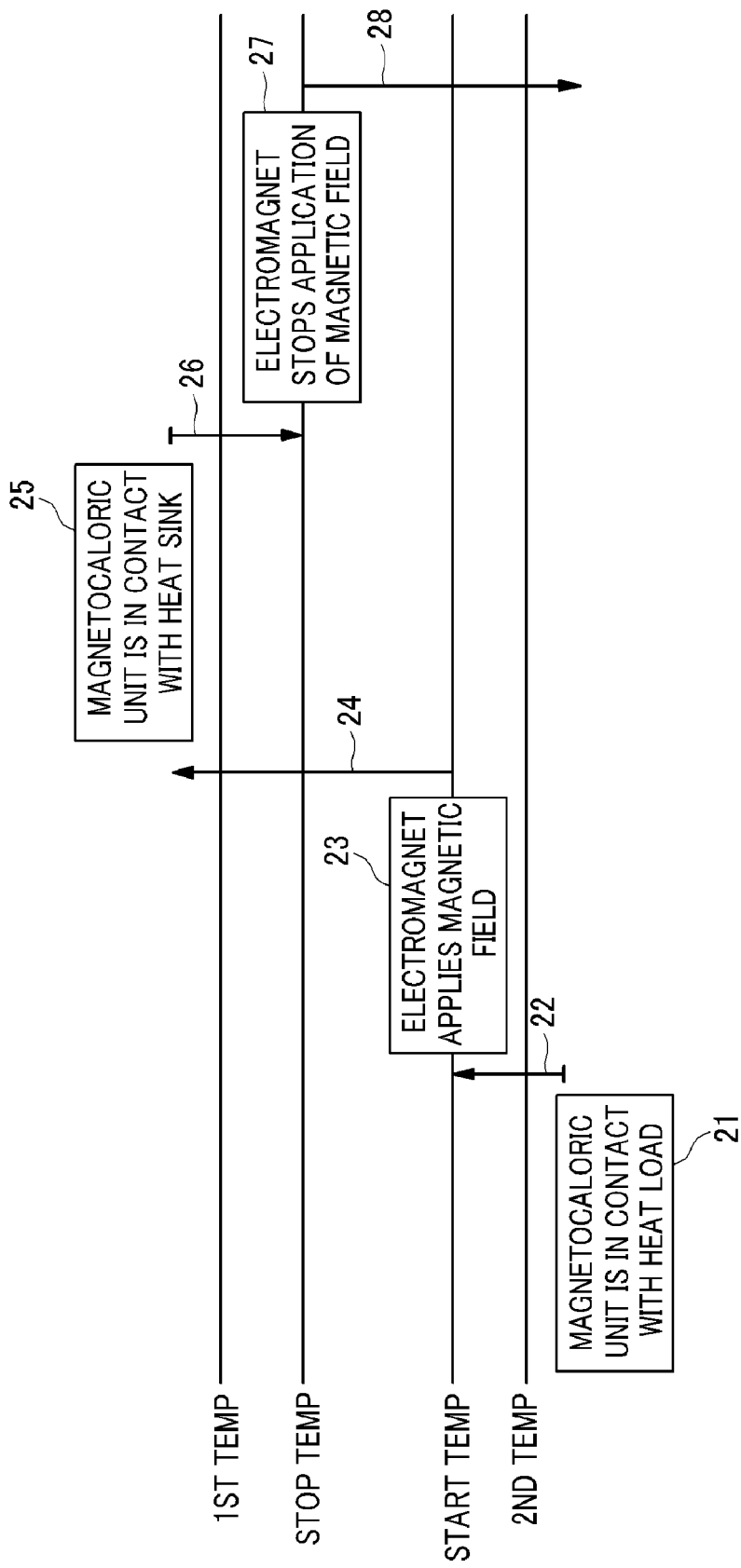
FIG. 3 shows a schematic diagram of an operation of the cooling device in response to a temperature of a magnetocaloric unit.

FIG. 3 shows a schematic diagram of an operation of the cooling device in response to the temperature of magnetocaloric unit 100. Hereinafter, magnetic-field-application-start temperature (hereinafter, simply referred to as "a start temperature") of magnetocaloric unit 100 refers to a temperature at which electromagnet 200 starts to apply a magnetic field to magnetocaloric unit 100, and magnetic-field-application-stop temperature (hereinafter, simply referred to as "a stop temperature") of magnetocaloric unit 100 refers to a temperature at which electromagnet 200 stops the application of the magnetic field to magnetocaloric unit 100.

The start temperature may be in the range from about −9° C. to about 0° C., but it is not limited thereto. If magnetocaloric unit 100 is heated to the start temperature or higher by absorption of heat from heat load 400, heated magnetocaloric unit 100 may not efficiently absorb heat from heat load 400. Thus, if the temperature of magnetocaloric unit 100 increases to the start temperature, electromagnet 200 applies the magnetic field to magnetocaloric unit 100 to align magnetic moment 12. The start temperature may be predetermined in consideration of a desired temperature of heat load 400.

Furthermore, the stop temperature may be in the range from about 50° C. to about 59° C., but it is not limited thereto. If magnetocaloric unit 100 is heated by the application of the magnetic field to magnetocaloric unit 100, the heat from heated magnetocaloric unit 100 is emitted through heat sink 300. Then, if the temperature of heated magnetocaloric unit 100 decreases to the stop temperature, electromagnet 200 stops the application of the magnetic field to magnetocaloric unit 100 to cool down magnetocaloric unit 100. The stop temperature may be predetermined in consideration of a temperature characteristic of a magnetocaloric material of magnetocaloric unit 100.

Further, heat-sink-contact temperature (hereinafter, simply referred to as "a first temperature") of magnetocaloric unit 100 refers to a temperature at which magnetocaloric unit 100 starts to be in contact with heat sink 300, and heat-load-contact temperature (hereinafter, simply referred to as "a second temperature") of magnetocaloric unit 100 refers to a temperature at which magnetocaloric unit 100 starts to be in contact with heat load 400. The first temperature may be in the range from about 60° C. to about 65° C., but it is not limited thereto. Further, the second temperature may be in the range from about −15° C. to about −10° C., but it is not limited thereto. The first temperature and the second temperature may be predetermined in consideration of a characteristic of a magnetocaloric material of magnetocaloric unit 100. Further, operations of thermostat switch 500 may be controlled based on the first temperature and the second temperature. The operations of thermostat switch 500 will be explained with reference to FIGS. 6A and 6B.

By way of example, if the temperature of magnetocaloric unit 100 increases to a temperature higher than a first temperature, e.g., about 60° C., a height of thermostat switch 500 may increase in response to the increase of the temperature of magnetocaloric unit 100. To be more specific, metal strip 510 having a higher thermal expansion rate may more expand than metal strip 520 having a lower thermal expansion rate in response to the increase of the temperature of magnetocaloric unit 100, and, thus, thermostat switch 500 can be bent toward metal strip 510 and the height of thermostat switch 500 can increase. Accordingly, magnetocaloric unit 100 may be upwardly pushed by the increased height of thermostat switch 500, and, thus, magnetocaloric unit 100 may be in contact with heat sink 300.

Further, if the temperature of magnetocaloric unit 100 decreases to a temperature lower than a second temperature, e.g., about −10° C., a height of thermostat switch 500 may decrease in response to the decrease of the temperature of magnetocaloric unit 100. To be more specific, metal strip 510 having the higher thermal expansion rate may more contract than metal strip 520 having the lower thermal expansion rate in response to the decrease of the temperature of magnetocaloric unit 100, and, thus, thermostat switch 500 can be bent toward metal strip 520 and the height of thermostat switch 500 can decrease. Accordingly, the distance between magnetocaloric unit 100 and heat load 400 may be reduced as the height of thermostat switch 500 decreases, and, then, magnetocaloric unit 100 may be in contact with heat load 400 if the height of thermostat switch 500 is substantially identical to a depth of recess 410.

Further, if the temperature of magnetocaloric unit 100 is between the second temperature (e.g., about −10° C.) and the first temperature (e.g., about 60° C.), magnetocaloric unit 100 may be isolated from both heat sink 300 and heat load 400 by thermostat switch 500. Specifically, in case that the temperature of magnetocaloric unit 100 is between the second temperature and the first temperature, the height of thermostat switch 500 may be higher than the depth of recess 410 and may not be sufficiently high to make magnetocaloric unit 100 in contact with heat sink 300.

Referring to FIG. 3, when a temperature of magnetocaloric unit 100 is lower than the second temperature (e.g., about −10° C.), magnetocaloric unit 100 may be in contact with heat load 400 and may absorb heat from heat load 400 by thermal conduction (block 21).

The temperature of magnetocaloric unit 100 may increase to the start temperature (e.g., about −5° C.) by the absorption of heat from heat load 400 (as depicted by arrow 22). Further, magnetocaloric unit 100 may be isolated from heat load 400 by thermostat switch 500 at a higher temperature than the second temperature (e.g., about −10° C.) and may stop the absorption of heat from heat load 400. To be more specific, if the heat of magnetocaloric unit 100 is transferred to thermostat switch 500, a height of thermostat switch 500 may be increased, and thermostat switch 500 can push magnetocaloric unit 100 toward heat sink 300. Further, at the temperature higher than the second temperature (e.g., about −10° C.), the height of thermostat switch 500 may be increased higher than a depth of recess 410, and magnetocaloric unit 100 can be isolated from heat load 400 by the increased height of thermostat switch 500. Then, magnetocaloric unit 100 may stop the absorption of the heat from heat load 400.

Furthermore, if the temperature of magnetocaloric unit 100 reaches the start temperature (e.g., about −5° C.), electromagnet 200 may apply a magnetic field to magnetocaloric unit 100 (block 23). In this case, the temperature of magnetocaloric unit 100 is sensed by temperature sensor 800, and controller 900 may generate a control signal based on the sensed temperature and transmit the control signal to electromagnet 200 so as to apply the magnetic field to magnetocaloric unit 100.

Then, the temperature of magnetocaloric unit 100 may increase to be higher than the first temperature (e.g., about 60° C.) by the application of the magnetic field (as depicted by arrow 24).

Moreover, if the temperature of magnetocaloric unit 100 increases to the first temperature (e.g., about 60° C.) or higher, magnetocaloric unit 100 may be in contact with heat sink 300 by using thermostat switch 500 and may transfer heat to heat sink 300 (block 25). To be more specific, heat of magnetocaloric unit 100 may be transferred to thermostat switch 500, and, the height of thermostat switch 500 may be increased due to the heat transfer. Further, at the temperature higher than the first temperature (e.g., about 60° C.), the height of thermostat switch 500 may be sufficiently increased to make magnetocaloric unit 100 in contact with heat sink 300. Accordingly, at the temperature higher than the first temperature (e.g., about 60° C.), magnetocaloric unit 100 can be in contact with heat sink 300 by heated thermostat switch 500. Then, heated magnetocaloric unit 100 may emit heat therein through heat sink 300.

The temperature of magnetocaloric unit 100 may decrease to the stop temperature (e.g., about 55° C.) because of the transfer of heat to heat sink 300 (as depicted by arrow 26).

Further, at a lower temperature than the first temperature, the height of thermostat switch 500 may decreased enough to isolate magnetocaloric unit 100 from heat sink 300. Accordingly, magnetocaloric unit 100 may be isolated from heat sink 300 by thermostat switch 500 at a lower temperature than the first temperature (e.g., about 60° C.), and may stop the transfer of heat to heat sink 300.

Still further, if the temperature of magnetocaloric unit 100 decreases to the stop temperature (e.g., about 55° C.), electromagnet 200 may stop the application of the magnetic field to magnetocaloric unit 100 (block 27). Thus, the temperature of magnetocaloric unit 100 may decrease to a temperature lower than the second temperature (e.g., about −10° C.) by the stop of the application of the magnetic field (arrow 28). Further, at a lower temperature than the second temperature, the height of thermostat switch 500 may be decreased lower than the depth of recess 410. Accordingly, magnetocaloric unit 100 may be in contact with heat load 400 by the decreased height of thermostat switch 500 and may absorb heat from heat load 400 again (block 21). Thereafter, the aforementioned operations will be repeated.

Figure 4:
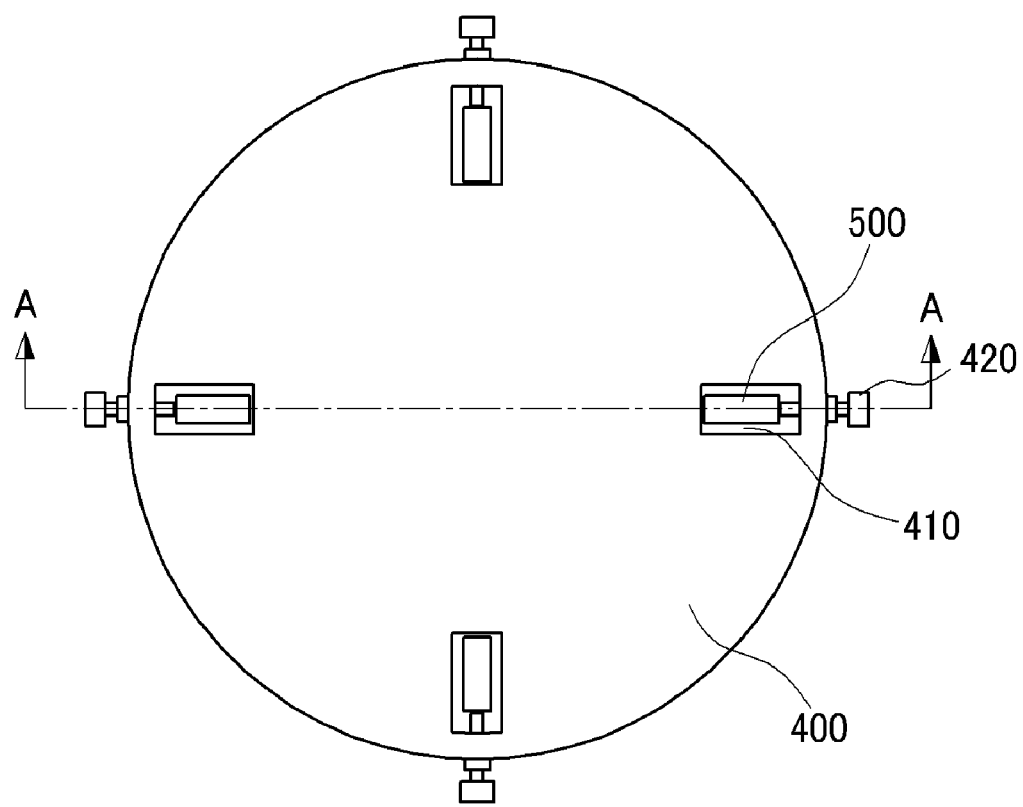
FIG. 4 is a top view of an illustrative embodiment of a thermostat switch disposed on a heat load.
Figure 5:
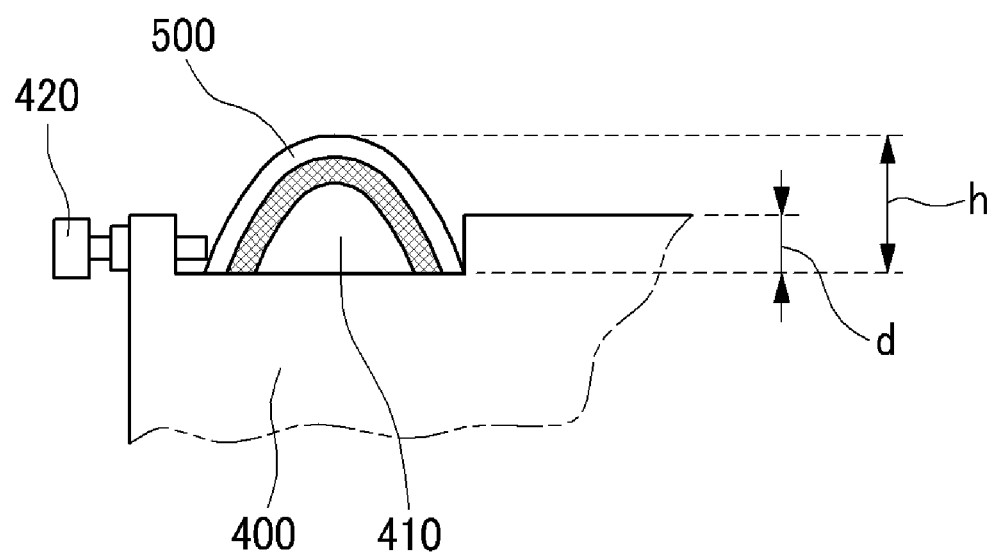
FIG. 5 is a longitudinal cross-sectional view of an illustrative embodiment of the thermostat switch disposed in a recess.

FIG. 4 is a top view of an illustrative embodiment of the thermostat switch shown in FIG. 1. FIG. 5 is a longitudinal cross-sectional view of the thermostat switch taken along line A-A shown in FIG. 4.

FIG. 4 depicts that heat load 400 includes multiple recesses 410 and multiple adjustment units 420. FIG. 4 further depicts that each thermostat switch 500 is disposed in each recess 410. Although FIG. 4 depicts four recesses 410 and four adjustment units 420, it is apparent to those skilled in the art that heat load 400 may include less than four or greater than four recesses 410 and adjustment units 420. FIG. 5 depicts that both ends of thermostat switch 500 are fixed in recess 410 by adjustment unit 420.

Referring to FIG. 5, adjustment unit 420 may be configured to set an initial height h of thermostat switch 500. Adjustment unit 420 may adjust initial height h of thermostat switch 500 such that a height of thermostat switch 500 at the second temperature is higher than a depth d of recess 410. In one embodiment that adjustment unit 420 may be implemented by a screw, the screw may apply a pressure to thermostat switch 500 to adjust initial height h of thermostat switch 500. That is, adjustment unit 420 may increase initial height h of thermostat switch 500 by turning the screw in one direction, whereas adjustment unit 420 may decrease initial height h of thermostat switch 500 by turning the screw in the opposite direction.

After initial height h of thermostat switch 500 is set by adjustment unit 420, if a temperature of magnetocaloric unit 100 increases, height of thermostat switch 500 may become higher than initial height h. Specifically, metal strip 510 having a higher thermal expansion rate may more expand than metal strip 520 having a lower thermal expansion rate in response to the increase of the temperature of magnetocaloric unit 100, and, thus, thermostat switch 500 can be bent toward metal strip 510 and the height of thermostat switch 500 can increase.

Further, if a temperature of magnetocaloric unit 100 decreases, height of thermostat switch 500 may be lower than initial height h. To be more specific, metal strip 510 having the higher thermal expansion rate may more contract than metal strip 520 having the lower thermal expansion rate in response to the decrease of the temperature of magnetocaloric unit 100, and, thus, thermostat switch 500 can be bent toward metal strip 520 and the height of thermostat switch 500 can decrease. With such changes in height of thermostat switch 500, thermostat switch 500 may make magnetocaloric unit 100 in contact with either heat sink 300 or heat load 400.

Figure 6A:
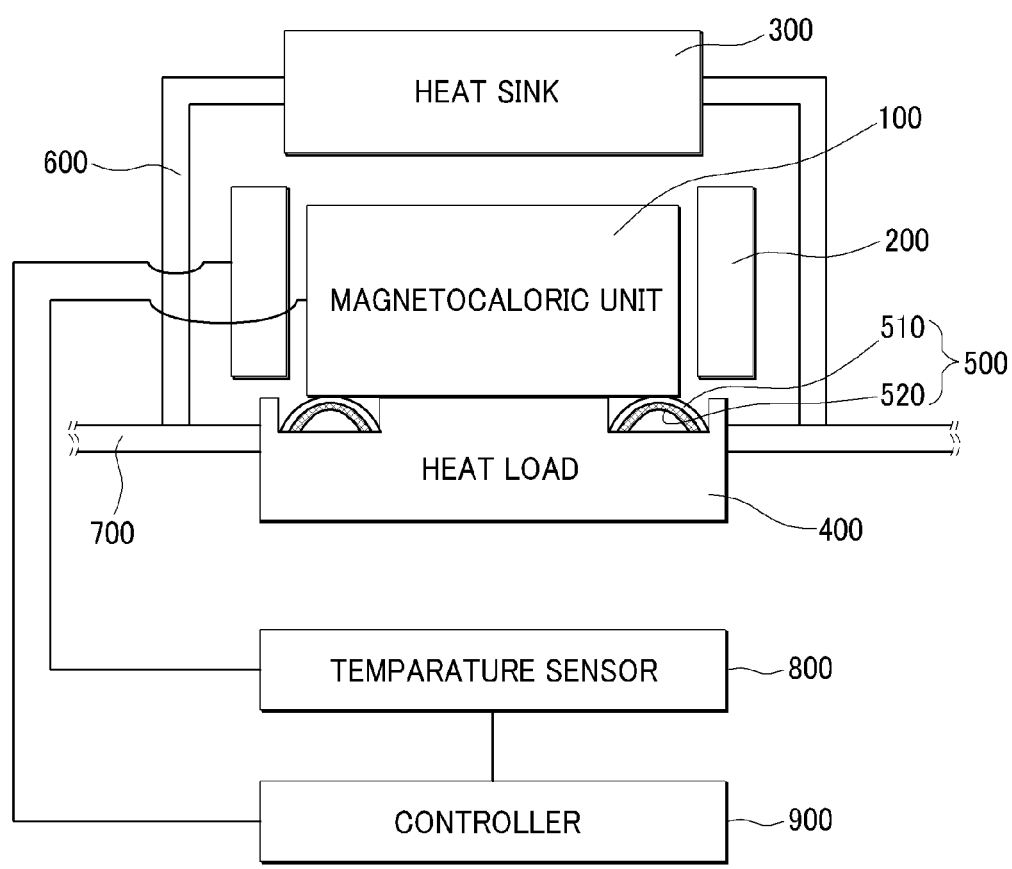
FIG. 6A shows a case where a magnetocaloric unit is in contact with the heat load by the thermostat switch.
Figure 6B:
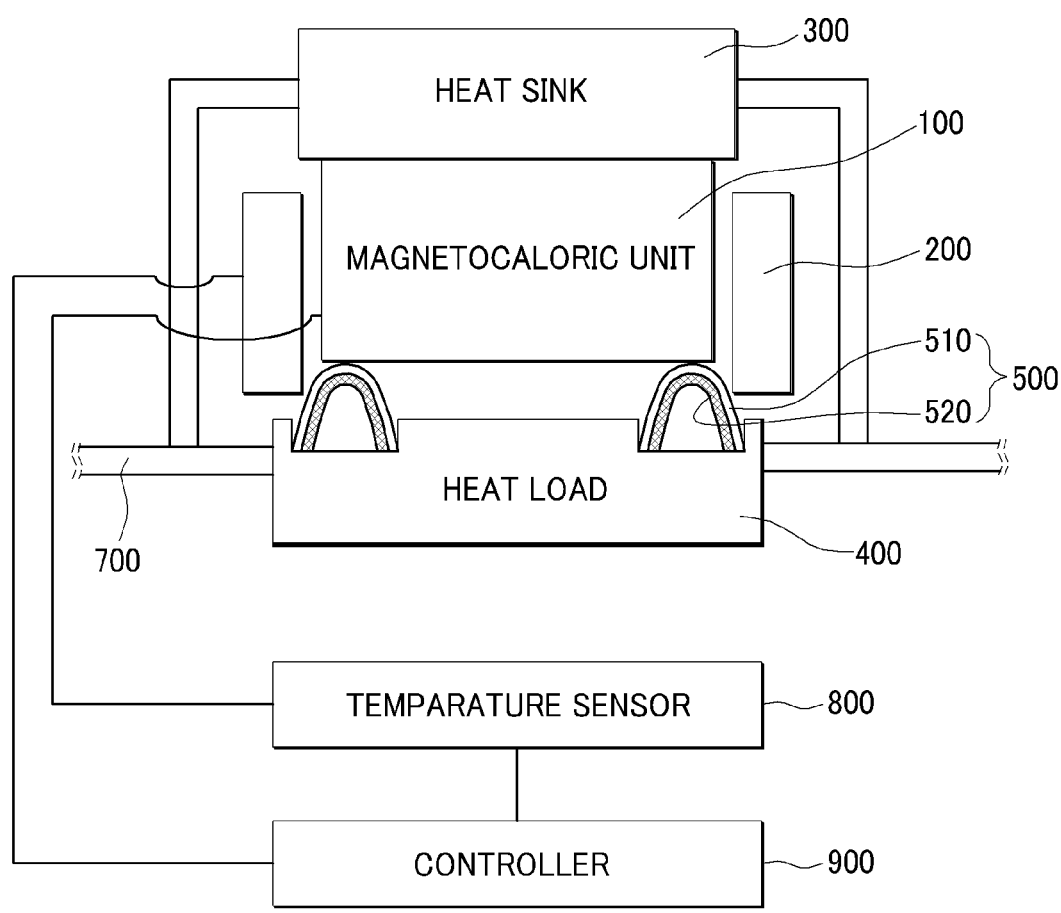
FIG. 6B shows a case where the magnetocaloric unit is in contact with a heat sink.

FIG. 6A shows the cooling device of FIG. 1 in which the magnetocaloric unit is in contact with the heat load by using the thermostat switch. FIG. 6B shows the cooling device of FIG. 1 in which the magnetocaloric unit 100 is in contact with the heat sink by using the thermostat switch.

Magnetocaloric unit 100 can become cooled at a temperature lower than the second temperature, and, then, absorb heat from heat load 400, as described above. Specifically, a portion of magnetocaloric unit 100 not contacting thermostat switch 500 may be in contact with heat load 400 due to the reduced height of thermostat switch 500 at the temperature of magnetocaloric unit 100 lower than the second temperature. Thus, heat load 400 can be kept in contact with magnetocaloric unit 100 while the temperature of magnetocaloric unit 100 is lower the second temperature.

As depicted in FIG. 6B, if electromagnet 200 applies a magnetic field to magnetocaloric unit 100, the temperature of magnetocaloric unit 100 increases by the magnetic field. Then, thermostat switch 500 will be bent upward, thereby pushing magnetocaloric unit 100 toward heat sink 300. Specifically, at a temperature higher than the second temperature, a portion of magnetocaloric unit 100 not contacting thermostat switch 500 may be further apart from heat load 400, and, thermostat switch 500 may maintain the isolation between heat load 400 and the portion of magnetocaloric unit 100 if the temperature of magnetocaloric unit 100 is higher than the second temperature. Further, at a temperature higher than the first temperature, an upper surface of magnetocaloric unit 100 can be in contact with heat sink 300 by heated thermostat switch 500. Accordingly, upwardly pushed magnetocaloric unit 100 can be in contact with heat sink 300 at the first temperature or higher, and heat of magnetocaloric unit 100 can be transferred to heat sink 300.

Figure 7:
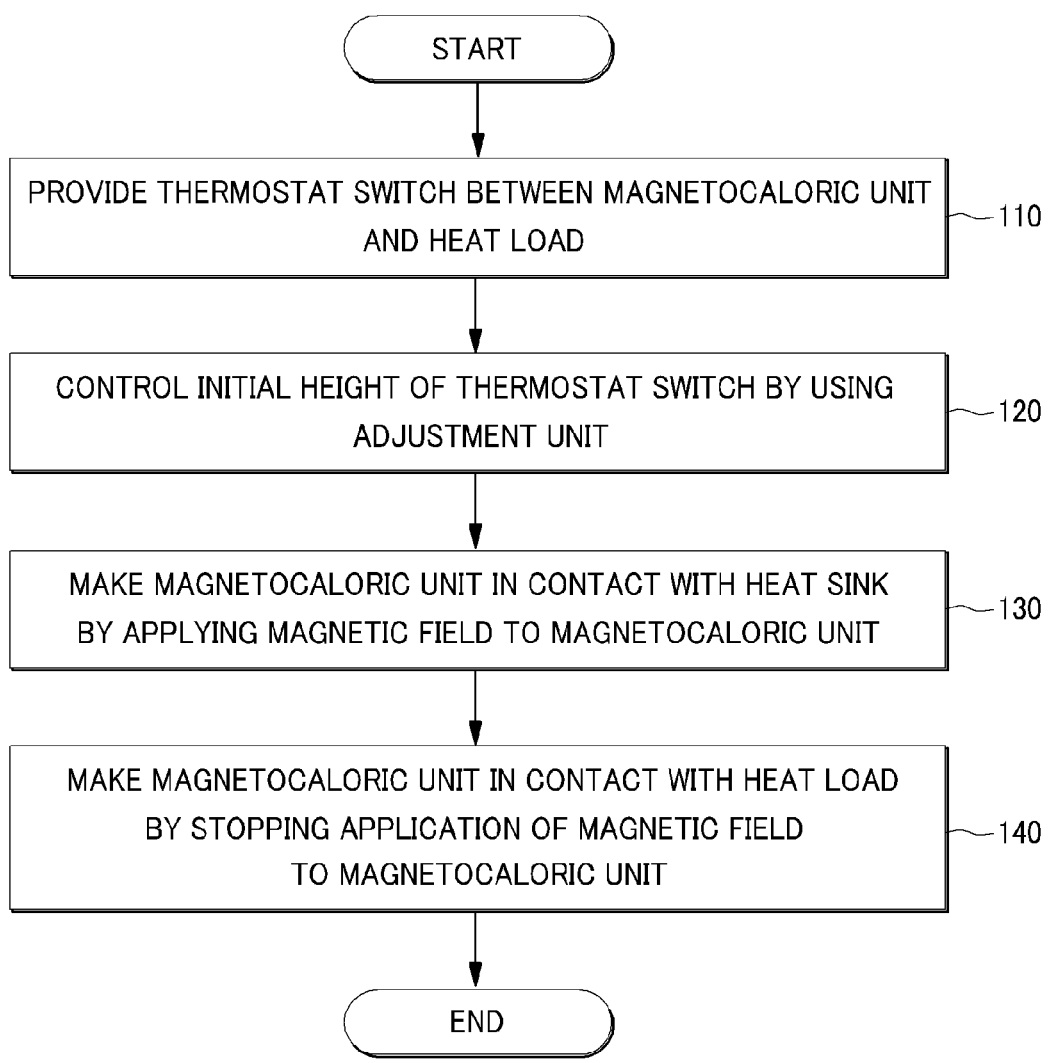
FIG. 7 is a flow chart of an illustrative embodiment of a method of controlling the cooling device.

FIG. 7 is a flow chart of an illustrative embodiment of a method of controlling the cooling device.

Thermostat switch 500 is provided between magnetocaloric unit 100 and heat load 400 (block 110). Heat load 400 may include two or more recesses 410, and each thermostat switch 500 may be disposed in each recess 410 described in the illustrative embodiment referring to FIG. 4. Further, by way of example, both ends of thermostat switch 500 may be fixed by recess 410 and adjustment unit 420.

An initial height h of thermostat switch 500 is adjusted by adjustment unit 420 (block 120). Adjustment unit 420 applies a pressure to thermostat switch 500, thereby adjusting the initial height h of thermostat switch 500. Adjustment unit 420 may adjust height h of thermostat switch 500 such that a maximum height of thermostat switch 500 is higher than a depth 20 of recess 410 described in the illustrative embodiment referring to FIG. 5.

When a magnetic field is applied to magnetocaloric unit 100 by electromagnet 200, magnetocaloric unit 100 is in contact with heat sink 300 (block 130). As discussed above, since magnetic moments 12 in magnetocaloric unit 100 are arranged in a single direction by the applied magnetic field, a temperature of magnetocaloric unit 100 will be increased. With the increase in the temperature of magnetocaloric unit 100, thermostat switch 500 is bent upward, thereby pushing magnetocaloric unit 100 toward heat sink 300. Then, upwardly pushed magnetocaloric unit 100 is in contact with heat sink 300 and emits heat through heat sink 300.

If the application of the magnetic field to magnetocaloric unit 100 is stopped, magnetocaloric unit 100 is cooled down and thermostat switch 500 is bent downward. Then, magnetocaloric unit 100 is in contact with heat load 400 (block 140).

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A cooling device comprising:
   a magnetocaloric unit disposed between a heat sink and a heat load;
   an electromagnet operably connected with the magnetocaloric unit; and
   at least one thermostat switch disposed between the magnetocaloric unit and the heat load, the thermostat switch being configured to adjust a physical location of the magnetocaloric unit to selectively place the magnetocaloric unit in contact with either the heat load or the heat sink.

2. The cooling device of claim 1, wherein the thermostat switch is configured to selectively place the magnetocaloric unit in contact with either the heat load or the heat sink according to a temperature of the magnetocaloric unit.

3. The cooling device of claim 2, wherein the thermostat switch is configured to selectively place the magnetocaloric unit in contact with the heat sink at a first temperature of the magnetocaloric unit, and to selectively place the magnetocaloric unit in contact with the heat load at a second temperature of the magnetocaloric unit, the first temperature being higher than the second temperature.

4. The cooling device of claim 1, wherein the magnetocaloric unit includes at least one of Gadolinium (Gd) and MnFe (P, As) alloys.

5. The cooling device of claim 1, wherein the thermostat switch includes a bimetal switch configured to convert a temperature change into mechanical displacement.

6. The cooling device of claim 5, wherein the bimetal switch includes two metal strips of different metals having different thermal expansion rates and the metal strip having a higher thermal expansion rate is disposed closer to the magnetocaloric unit than the metal strip having a lower thermal expansion rate.

7. The cooling device of claim 1, further comprising an adjustment unit configured to adjust an initial height of the thermostat switch.

8. The cooling device of claim 7, wherein the heat load includes at least one recess configured to receive the at least one thermostat switch therein.

9. The cooling device of claim 8, wherein the adjustment unit adjusts the initial height of the thermostat switch such that a maximum height of the thermostat switch is higher than a depth of the recess.

10. The cooling device of claim 7, wherein the adjustment unit is further configured to provide the thermostat switch with a pressure to adjust the initial height of the switch.

11. The cooling device of claim 7, wherein the adjustment unit includes at least one screw.

12. A cooling device comprising:
a magnetocaloric unit disposed between a heat sink and a heat load;
an electromagnet operably connected with the magnetocaloric unit; and
at least one thermostat switch disposed between the magnetocaloric unit and the heat load, wherein the at least one thermostat switch is configured to make the magnetocaloric unit in contact with either the heat sink or the heat load by changing of a height of the thermostat switch.

13. The cooling device of claim 12, wherein the height of the thermostat switch is changed depending on a temperature of the magnetocaloric unit.

14. The cooling device of claim 13, wherein the thermostat switch is further configured to be bent and push the magnetocaloric unit toward the heat sink at a predetermined temperature of the magnetocaloric unit.

15. A method for controlling a cooling device, the method comprising:
providing at least one switch between a magnetocaloric unit and a heat load, the magnetocaloric unit placed between the heat load and a heat sink;
making the magnetocaloric unit in contact with the heat sink by adjusting a physical location of the magnetocaloric unit in response to an application of a magnetic field to the magnetocaloric unit; and
making the magnetocaloric unit in contact with the heat load by adjusting the physical location of the magnetocaloric unit in response to stopping the application of the magnetic field to the magnetocaloric unit.

16. The method of claim 15, wherein the at least one switch is a thermostat switch.

17. The method of claim 16, wherein the magnetocaloric unit is configured to heat up the at least one thermostat switch in response to the application of the magnetic field.

18. The method of claim 17, wherein the at least one thermostat switch is configured to push the magnetocaloric unit toward the heat sink in response to heat generated by the magnetocaloric unit.

19. The method of claim 15, wherein the magnetocaloric unit includes at least one of Gadolinium (Gd) and MnFe (P, As) alloys.

20. The method of claim 15, further comprising:
adjusting an initial height of the switch prior to the application of the magnetic field.

* * * * *

UNITED STATES PATENT AND TRADEMARK OFFICE
CERTIFICATE OF CORRECTION

| | | |
|---|---|---|
| PATENT NO. | : 8,375,727 B2 | Page 1 of 1 |
| APPLICATION NO. | : 12/813793 | |
| DATED | : February 19, 2013 | |
| INVENTOR(S) | : Sohn | |

It is certified that error appears in the above-identified patent and that said Letters Patent is hereby corrected as shown below:

On the Title Page, item (57), under "ABSTRACT", in Column 2, Line 4, delete "magneto caloric" and insert -- magnetocaloric --, therefor.

On the Title Page, for Tag "800", in Line 1, delete "TEMPARATURE" and insert -- TEMPERATURE --, therefor.

In the Drawings:

In Fig. 1, Sheet 1 of 8, for Tag "800", in Line 1, delete "TEMPARATURE" and insert -- TEMPERATURE --, therefor.

In Fig. 6A, Sheet 6 of 8, for Tag "800", in Line 1, delete "TEMPARATURE" and insert -- TEMPERATURE --, therefor.

In Fig. 6B, Sheet 7 of 8, for Tag "800", in Line 1, delete "TEMPARATURE" and insert -- TEMPERATURE --, therefor.

In the Specifications:

In Column 8, Line 51, delete "depth 20 of recess" and insert -- depth of recess --, therefor.

Signed and Sealed this
Eleventh Day of June, 2013

Teresa Stanek Rea
*Acting Director of the United States Patent and Trademark Office*